United States Patent Office 3,086,947
Patented Apr. 23, 1963

3,086,947
CATION PERMSELECTIVE MEMBRANES
Tsutomu Kuwata and Sadao Yoshikawa, Tokyo, Japan, assignors to Asahi Garasu Kabushiki Kaisha (Asahi Glass Co., Ltd.), Tokyo, Japan, a corporation of Japan
No Drawing. Filed July 19, 1955, Ser. No. 523,107
Claims priority, application Japan July 24, 1954
4 Claims. (Cl. 260—2.2)

The present invention relates to cation permselective membranes, and more particularly to cation permselective membranes consisting of cation exchange resins.

An object of this invention is to provide cation permselective membranes which are high in ion permselectivity, excellent in mechanical strengths and are also excellent in properties, such as exchange capacity, transport number, electric resistance and the like.

Another object of this invention is the provision of excellent cation permselective membranes in a film state, which are not subject to cracking due to swelling and contraction.

A further object of this invention is to make on a large scale excellent products of any desired dimensions by sulfonating raw films produced in the shape of thin films.

A still further object of the invention is to obtain with ease cation permselective membranes, which have high mechanical strengths and are small in thickness and of low electric resistance, from copolymers used as raw material ready to be formed into thin films.

Other objects, features, and advantages of this invention will be apparent from the following description.

It has long been known that collodion films have cation permselectivity, and that such collodion films treated with basic dyestuffs or alkaloids have anion permselectivity. However, these films not only are low in ion permselectivity, but also have a deficiency that, as the concentration of the solution increases, they lose their selectivity and also, when an electric current is passed through such membranes, they show high electric resistance. Recently, with the development of ion-exchange resins, it has been found that films comprised of an ion-exchange resin have high ion selectivity which is retained even in solutions of high concentration, and also have a good electric conductivity.

The base of ion-exchange resins is an organic high-molecular compound, with which are combined a number of hydrophilic ion-exchange radicals so that their swelling or contraction in water is so intense as to cause cracking. In the case of granular ion-exchange resins, this problem of cracking is not serious unless degradation arises in the resins, but when they are used for an ion permselective membrane in the form of a film, it may lead to cause the membrane to permit the passage of the solution in addition to ion permeation, and such cracking can never be allowed. This is the reason why the production of ion-exchange resins in a film state is extremely difficult.

This invention has been made through various researches and investigations in order to obtain excellent products free from such deficiencies.

That is, the present invention comprises the method of making cation permselective membranes characterized in that filmy substances or thin substance in a film shape of the copolymer of a compound which has a vinyl group and into which an ion-exchange radical can be introduced, viz., a monovinyl aromatic compound and a linear aliphatic polyene hydrocarbon is sulfonated to introduce a cation-exchange radical into said substance.

The term "copolymer" as used in this specification indicates a copolymer itself and also its vulcanized products.

As a compound, which has a vinyl group and into which an ion-exchange radical can be introduced are employed, for examples, styrene, vinyl-toluene, vinyl-xylene, ethyl-styrene, diethyl-styrene and the like, and as a linear aliphatic polyene hydrocarbon can be referred to butadiene, isoprene and the like.

To sulfonate filmy substances of the copolymer obtained in the manner described herein, sulfonating agents, such as concentrated sulfuric acid, oleum, and chlorsulfonic acid, are used. Thus, thin filmy substances as described hereinbefore are then sulfonated by any of these sulfonating agents to introduce a sulfonic group into such films as an ion-exchange radical.

In addition, while a sulfonic group is generally preferred as a cation-exchange radical to be introduced, other cation-exchange radicals, such as carboxylic group or phosphonic group, may, of course, be introduced when necessary.

A typical example of copolymers of a compound which has a vinyl group and into which an ion-exchange radical can be introduced, and a linear aliphatic polyene hydrocarbon is a styrene-butadiene copolymer known as a synthetic rubber, whose base consists of copolymers entangled with each other and having such a linear structure as

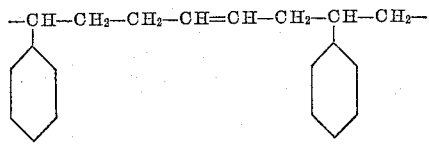

and which has few aromatic nuclei as compared with a styrene-divinylbenzene copolymer, representative of granular ion-exchange resins and also sparsely combines, so that a linear aliphatic hydrocarbon interposed between such aromatic nuclei permits the base to elongate to some extent.

Accordingly, such copolymer, when sulfonated, provides excellent films, which causes no cracks upon swelling or contraction even when it has a comparatively large number of sulfonic groups contained therein.

Styrene-butadiene copolymer as raw material for the above-described copolymers, of course, varies its properties with the proportion of styrene to butadiene; that is, the smaller its styrene content is, the larger its elasticity is, and on the other hand its tensile strength is the poorer. According to the invention, a copolymer containing, say, more than 20% of linear aliphatic polyene compound against monovinyl aromatic compound is sulfonated, and those with higher proportions of the monovinyl aromatic compound crack when sulfonated in a film state, as in the case of a styrene-divinylbenzene copolymer. The percentage of the vinyl aromatic compound providing particularly satisfactory results ranges from 30 to 70 percent.

According to the invention, such copolymers are formed into thin films and then sulfonated, and in styrene-butadiene copolymers containing styrene in an amount of less than 40%, it is not easy to roll them into a film because of their excessive elasticity so that it is preferable to dissolve them in a solvent, such as benzene, toluene and xylene, and to flow and spread the solution over a smooth horizontal plane in a thin layer, after which the thin layer is naturally dried to form a thin film, while in cases where the styrene content is more than 40%, such copolymers may, as described above, be dissolved in a solvent and then the resulting solution be flowed into thin films, but they may also be rolled into thin films by rolling because of easy operation and other merits.

In addition, not only styrene-butadiene copolymer but also a styrene-acrylonitrile copolymer or a mixture of both copolymers can be used and thin films made of a mixture of any such copolymer or copolymers with raw rubber may also be used as raw material.

These copolymers may be used as raw material without being vulcanized or with vulcanization. For effecting such vulcanization sulfur, accelerators for vulcanization, filler, and the like, are added to the copolymer, the mixture thus obtained being well kneaded by a mixing roll and formed into films, which may then be heated and vulcanized or, as the case may be, may be subjected to cold vulcanization with sulfur chloride diluted with a solvent or sulfur chloride alone.

Further, as a sulfonating agent for sulfonating thin films of the copolymers, concentrated sulfuric acid, oleum, chlorsulfonic acid, and the like may be used as described above. However, sulfonation is preferably effected under conditions as mild as possible to provide satisfactory results with respect to various properties of the films.

Thus, as sulfonating temperature those close to the room temperature are suitable, and at higher temperatures, the velocity of sulfonation is remarkably increased, but the films swell markedly and their strength is lowered, thus rendering it difficult to obtain membranes of good permselectivity.

While the temperature, of course, depends upon the membrane thickness and other conditions, it is preferably kept under the order of 50° C. or less.

In addition, with the intention of effecting sulfonation under conditions as mild as possible, it is advisable to use concentrated sulfuric acid as a sulfonating agent. According to the tests where direct sulfonation with 20% oleum is effected, membranes thus produced have been ready to crack. However, the velocity of sulfonation is inevitably slightly diminished when the sulfonation is effected with concentrated sulfuric acid alone. If a higher reaction velocity under comparatively mild conditions is desired, such a method may be employed in which, in the course of the sulfonation with concentrated sulfuric acid, oleum is gradually added to said acid. In this method there is no fear of cracking.

When the membranes are washed with water immediately after sulfonation in order to remove the part of sulfuric acid which remains unreacted after the completion of sulfonation, the membranes are apt to crack, and hence it is preferable to immerse them successively in 80% and 40% sulfuric acid, each for some fifteen minutes, and then finally to rinse them with water.

In the case of sulfonation, the reaction starts on the surface of the membrane and proceeds gradually into the interior thereof and thus, when the thickness of the membrane is larger, nonuniformity of the reaction through the membrane is more remarkable.

According to the experimental results, contrary to the expectation that, when a raw film of a large thickness is sulfonated, the strength of the product will generally be correspondingly large, the strength of the raw film of a large thickness has been remarkably reduced by sulfonation and the tendency of the film to cracking has also been large and from the results thereof, it has been found that thicknesses under the order of some 0.2 mm. are desirable for styrene-butadiene copolymer, of which the styrene content is the order of about 30% or 40% and which is made in a shape of thin films by dissolving said copolymer in a solvent and that, when styrene-butadiene copolymer, of which the styrene content of 50% and which is formed in a shape of thin films by rolling is used as raw material, it is desirable to use films of 0.5 mm. or less in thickness. Further, in styrene-butadiene copolymer containing styrene in an amount of 65%, the decrease of the strength due to sulfonation is comparatively small and the tendency to cracking is also weak, even in larger thicknesses. However, also in this case, membranes of the thicknesses of 0.5 mm. or less bring better results.

As described above, there are two methods in forming copolymers into thin films, one comprising rolling them into films and the other comprising dissolving them in a solvent, flowing the solution over a smooth, horizontal plane and drying it to thin films, the latter method being preferred to obtain films from copolymer containing styrene in an amount of less than 40% or to obtain thin films less than 0.1 mm. thicknesses from copolymers whose styrene content is higher. However, in sulfonation, with respect to the films having the same thickness, there is seen a tendency that sulfonation proceeds more easily and the reaction is more uniform in films obtained by the former method than in films obtained by the latter. Further, while in copolymer films which have been vulcanized, the velocity of reaction is small in the earlier stages of sulfonation, no substantial difference in reaction velocity due to vulcanization is noticeable after the sulfonating agent has reached into the interior of the films.

The time of sulfonation, of course, depends upon the condition of sulfonation, the thickness of copolymer films as raw material, and other conditions. For instance, when films of 0.15 mm. thickness of styrene-butadiene copolymer containing styrene in an amount of 30% are firstly immersed in 96% concentrated sulfuric acid at 17° C., and then 30% oleum in an amount of some 20 percent of the initial concentrated sulfuric acid is added at intervals of an hour, sulfonation is completed in about four hours. Also, when films of 0.1 mm. thickness of styrene-butadiene copolymer containing styrene in an amount of 50% are sulfonated by means of 96% concentrated sulfuric acid at 17° C., the time required for sulfonation is of the order of some twenty to thirty hours. As described hereinbefore, sulfonation proceeds gradually from the surface of the raw film to the interior thereof, and as the sulfonating agent gets into the interior of the film, the velocity of sulfonation increases rapidly. Since the sulfonation takes a course as above, care must be taken particularly in the case of thick films that the sulfonation may proceed well into the interior of the film, otherwise the tendency of the sulfonated surface portion of the film to separate from the unsulfonated central portion thereof might be shown when the film is washed with water after the sulfonation.

The invention is further disclosed in the following examples, which are illustrative but not limitative thereof:

*Example 1*

Styrene-butadiene copolymer containing styrene in an amount of 50% was rolled by hot rolling at 60° to 70° C. into a film of 0.4 mm. thickness, the film thus obtained was then made 18 cm. x 20 cm. in area and immersed in 500 grams of 96% sulfuric acid in a vessel with a flat bottom. The film turned gradually brownish and elongated, in which case the film surface was spread flat in order to prevent unevenness of the film due to ununiform elongation. After an hour, the film was drawn up and 50 grams of 50% oleum was added to the sulfuric acid and uniformly mixed, and then the film was again immersed in the mixture.

Similarly, after a second hour, 50 grams of 50% oleum was added and after a third hour another 50 grams of 50% oleum added. Then after being left for half an hour, the film now elongated to 22.5 cm. x 23 cm. was drawn up and then immersed successively in 60% and 30% sulfuric acids, each for fifteen minutes, and finally in water, and then boiled for half an hour in 1 N caustic soda, and thus a product, a cation permselective membrane was obtained.

The film thus obtained was greyish brown in acid and yellowish brown in alkali, its tensile strength being 150 kg./cm.$^2$. The properties of the film thus prepared will be entered in the table at the end of this specification along with those for other examples.

*Example 2*

A film similar to that in Example 1, 0.35 mm. in thickness with an area of 15 cm. x 15 cm., was put into a closed vessel and 200 grams of 96% sulfuric acid added thereto. After sulfonation at 18° to 20° C. for 24 hours, a product was then obtained in the same way as in Example 1.

*Example 3*

To ninety parts by weight of styrene-butadiene copolymer containing styrene in an amount of 50% were added one part of sulfur, one part of mercaptobenzothiazol, three parts of stearic acid, and 5 parts of zinc white, and the mixture rolled by hot rolling into a film of 0.3 mm. thickness, the film thus prepared was then hot vulcanized for half an hour at 130° to 140° C., immersed in 150 grams of 100% sulfuric acid in a closed vessel at 18° to 20° C. for 46 hours and then treated as in Example 1 so as to obtain a product.

*Example 4*

One part of styrene-butadiene copolymer containing styrene in an amount of 50% and one part of said copolymer containing styrene in an amount of 80% were well mixed by a kneading roll at 70° C. and the mixture was made into a film of 0.2 mm. thickness by hot rolling at 60° C. The film of a size 15 cm. x 15 cm. was immersed for 48 hours in 150 grams of 96% sulfuric acid in a closed vessel at 17° C. for sulfonation. After the reaction, the film was subjected to after-treatment as in Example 1 to obtain a product.

*Example 5*

Nine parts of styrene-butadiene copolymer containing styrene in an amount of 50% and one part of natural rubber were well kneaded by a mixing roll at 60° C. and the mixture rolled by hot rolling at 60° C. into a film of 0.3 mm. thickness. The film of a size 15 cm. x 15 cm. was immersed in 200 grams of 94% sulfuric acid in a closed vessel for 24 hours for sulfonation. After the reaction, the film was further subjected to treatment as in Example 1 to obtain a product.

*Example 6*

Four parts of styrene-butadiene copolymer containing styrene in an amount of 50%, four parts of styrene-butadiene copolymer containing styrene in an amount of 80% and two parts of acrylonitrile-butadiene copolymer containing acrylonitrile in an amount of 30% were well kneaded by a mixing roll heated to 70° C. and the mixture was rolled into a film 0.18 mm. thick by hot rolling at 65° C.

The film of a size 15 cm. x 15 cm. was immersed in 150 grams of 96% sulfuric acid in a closed vessel for 24 hours for sulfonation. After the reaction the film was subjected to after-treatment as in Example 1 to obtain a product.

*Example 7*

One hundred parts of styrene-butadiene copolymer containing styrene in an amount of 50% and three parts of stearic acid were well kneaded and then rolled into a film 0.18 mm. thick by hot rolling at 60° C.

The film of a size 5.5 cm. x 5.5 cm. was immersed in a 2% solution of sulfur chloride in tetrachloroethane in a closed vessel for 24 hours for cold vulcanization and then immersed for sulfonation in 40 grams of 98% sulfuric acid in a closed vessel for 24 hours. After the reaction, the film was subjected to after-treatment as in Example 1 to obtain a product.

*Example 8*

One part of styrene-butadiene copolymer containing styrene in an amount of 30% was completely dissolved in ten parts of xylene in a vessel fitted with a reflux of heating type and the solution was poured over the surface of mercury in a thin layer; it was naturally dried for 3 days to make a film. The film thus obtained, 0.15 mm. in thickness with an area of 5 cm. x 5 cm., was first immersed in 30 grams of 96% sulfuric acid at 20° to 25° C. for an hour and then immersed in 100% sulfuric acid for another hour, while the temperature was held at 50° C. After the reaction, the film was immersed successively in 80%, 50% and 20% sulfuric acids, each for a quarter of an hour, and finally, in water, thus a product being obtained.

*Example 9*

One part of styrene-butadiene copolymer containing styrene in an amount of 40% was completely dissolved in ten parts of toluene in a vessel fitted with a reflux of heating type, and the solution was flowed in a thin layer over a glass plate glazed with silicone grease and natural dried for a day. The membrane was stripped off and thus a thin film 0.06 mm. in thickness obtained. The film, 5 cm. x 5 cm. in area, was immersed for sulfonation in 20 grams of 96% sulfuric acid at 17° C. for two hours, then in 50% sulfuric acid for a quarter of an hour and finally in water, and thus a product obtained.

*Example 10*

A film 0.2 mm. in thickness was made in the same manner as in Example 9. The film of an area of 10 cm. x 10 cm. was first immersed in 96% sulfuric acid at 18° C. for an hour, and then respectively in 100% sulfuric acid and 5% oleum, each for an hour at 18° to 20° C., and made into a product through after-treatment as in Example 1.

The properties of the films obtained in the above examples are as entered in the following table, wherein the exchange capacity indicates milligram equivalent of the exchange radical per 1 gram of the Na-type film, water content a percentage of water contained in the Na-type wet film (excluding the water adhering to the film surface), transport number that for cations determined by the membrane potential difference when 0.5 N NaCl and 1 N NaCl are present on either side of the Na-type film, and the specific resistance designates that when the Na-type membrane is immersed in 0.5 N NaCl.

| Example No. | Exchange Capacity, m. eq./g. | Water Content, Percent | Thickness, mm. | Transport number | Specific Resistance, Ω cm. |
| --- | --- | --- | --- | --- | --- |
| 1 | 1.60 | 26 | 0.42 | 0.93 | 373 |
| 2 | 1.89 | 32 | 0.46 | 0.93 | 207 |
| 3 | 2.72 | 55 | 0.36 | 0.83 | 60 |
| 4 | 1.62 | 29 | 0.29 | 0.89 | 192 |
| 5 | 2.74 | 41 | 0.35 | 0.93 | 93 |
| 6 | 1.72 | 34 | 0.22 | 0.90 | 175 |
| 7 | 1.83 | 50 | 0.21 | 0.83 | 65 |
| 8 | 2.04 | 31 | 0.18 | 0.92 | 154 |
| 9 | 1.40 | 22 | 0.07 | 0.95 | 3,490 |
| 10 | 1.79 | 34 | 0.22 | 0.90 | 120 |

As above, the membranes obtained in accordance with the invention are excellent in mechanical strengths and also show outstanding characteristics in transport number, electric resistance, and the like. As will be seen, one of the advantages of the invention is that an excellent product is obtained by sulfonating raw films formed in thin films by rolling or other methods, and thus the invention is adequate for mass production techniques and fit for making large-size films. For granular sulfonated resins, a method is being employed in which styrene-divinyl benzene copolymer prepared beforehand is sulfonated, and it is a point to be noted in the invention that the employment of a similar procedure in the manufacture of filmy products has been made possible by the invention. Further, as one of the features, copolymers employed in the invention as raw material are easy to make into thin films and high in mechanical strengths so that cation permselective membranes, small in thickness, that is, in the order of 0.05 mm. to 0.1 mm. thickness, are easily obtained, such membranes being advantageous for their low electric resistance.

While the invention has been disclosed in connection with certain examples, it is obvious to those skilled in the art that it is not so limited, but is susceptible of various changes and modifications without departing from the spirit and scope of the invention as described in the specification and defined by the appended claims.

What we claim is:

1. A cation permselective membrane comprising a thin homogeneous film of a thickness of from 0.06 to 0.5 mm. and comprising a sulfonated copolymer of a mono-vinyl aromatic compound and a linear aliphatic polyene hydrocarbon, said copolymer containing from 30 to 70% by weight of aromatic compound.

2. A cation permselective membrane comprising a thin homogeneous film of a thickness of from 0.06 to 0.5 mm. and comprising a sulfonated copolymer of a mono-vinyl aromatic compound selected from the group consisting of styrene, vinyl-toluene, vinyl-xylene and ethyl styrene with a diolefin selected from the group consisting of butadiene and isoprene, said copolymer containing from 30 to 70% by weight of aromatic compound.

3. A cation permselective membrane comprising a thin homogeneous film of a thickness of from 0.06 to 0.5 mm. and comprising a sulfonated copolymer of styrene and butadiene, said copolymer containing from 30 to 70% by weight of styrene.

4. A cation permselective membrane comprising a thin homogeneous film of a sulfonated copolymer of styrene and butadiene, said copolymer containing 50% by weight of styrene, said film having a thickness of from 0.06 to 0.5 mm.

References Cited in the file of this patent

UNITED STATES PATENTS

| | | |
|---|---|---|
| 2,645,621 | D'Alelio | July 14, 1953 |
| 2,681,320 | Bodamer | June 15 1954 |
| 2,697,079 | D'Alelio | Dec. 14, 1954 |
| 2,730,768 | Clarke | Jan. 17 1956 |
| 2,731,411 | Clarke | Jan. 17, 1956 |